(12) United States Patent
Schuller et al.

(10) Patent No.: US 9,255,590 B2
(45) Date of Patent: Feb. 9, 2016

(54) VENTILATION DEVICE FOR A HYDRAULIC CYLINDER

(75) Inventors: Dietmar Schuller, Altmannstein (DE); Hans-Peter Fleischmann, Stammham (DE); Mathias Jakob-Bodenhagen, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 12/987,529

(22) Filed: Jan. 10, 2011

(65) Prior Publication Data

US 2011/0192701 A1    Aug. 11, 2011

(30) Foreign Application Priority Data

Jan. 13, 2010   (DE) .................. 10 2010 004 618

(51) Int. Cl.
| F16K 17/20 | (2006.01) |
| F15B 21/04 | (2006.01) |
| F16K 17/04 | (2006.01) |
| F16K 17/28 | (2006.01) |
| F16K 17/30 | (2006.01) |
| F15B 13/02 | (2006.01) |

(52) U.S. Cl.
CPC ........... F15B 21/044 (2013.01); F16K 17/0406 (2013.01); F16K 17/285 (2013.01); F16K 17/30 (2013.01); F15B 13/023 (2013.01)

(58) Field of Classification Search
CPC ............ F16K 17/0406; F16K 39/1053; F16K 17/285; F16K 17/30; Y10T 137/7866
USPC .................. 137/516.25, 516.27, 539, 533.11, 137/533.15, 543.13, 543.17, 540, 533.17
See application file for complete search history.

(56) References Cited

U.S. PATENT DOCUMENTS

| 2,761,468 | A | * | 9/1956 | Thatcher ........................ 137/539 |
| 3,735,777 | A | * | 5/1973 | Katzer et al. ................ 137/514.5 |
| 4,365,648 | A | * | 12/1982 | Grothe .......................... 137/539 |
| 5,725,013 | A | * | 3/1998 | Premiski et al. ........... 137/454.2 |
| 5,979,488 | A | | 11/1999 | Smith et al. |
| 6,244,295 | B1 | * | 6/2001 | Bartussek et al. ............ 137/540 |
| 2006/0231138 | A1 | | 10/2006 | Devall |

FOREIGN PATENT DOCUMENTS

| EP | 0515215 A1 | 11/1992 |
| EP | 2006587 A1 | 12/2008 |
| GB | 1180214 | 2/1970 |
| JP | 11294612 A | 1/1999 |
| JP | 2004293661 A1 | 10/2004 |
| WO | 2008039778 A2 | 4/2008 |

OTHER PUBLICATIONS

Chinese Office action dated Nov. 20, 2013 along with English translation.

* cited by examiner

*Primary Examiner* — Kevin Lee
*Assistant Examiner* — P. Macade Nichols
(74) *Attorney, Agent, or Firm* — Novak Druce Connolly Bove + Quigg LLP

(57) ABSTRACT

A ventilation device for a hydraulic cylinder providing a housing having a fluid passageway with an inlet and an outlet, and a closure member disposed in said passageway displaceable in obstructing relation with such inlet upon application of a first fluid force in such inlet, obstructing relation with such outlet upon application of a second fluid force on such inlet and in nonobstructing relation with either of such inlet and outlet upon application of a third fluid force between such first and second fluid forces.

6 Claims, 3 Drawing Sheets

VENTILATION DEVICE FOR A HYDRAULIC CYLINDER

The invention relates to a ventilation device that is intended for a hydraulic cylinder, in particular a dual clutch transmission, according to the preamble of claim 1.

BACKGROUND OF THE INVENTION

Ventilation devices of the type addressed herein are used in connection with hydraulic actuator chambers, in particular hydraulic cylinders, in order to be able to ventilate the hydraulic actuating circuit in the direction of the tank of the hydraulic medium. The objective is to provide a stable hydraulic line when the actuator is actuated. The said ventilation devices are used, in particular, in dual clutch transmissions, even more particularly in clutch cylinders of dual clutch transmissions. Such clutch cylinders serve to engage or release the clutches of a dual clutch transmission. Preferably, the said ventilation devices can also be used in connection with the gear actuating cylinders of a dual clutch transmission. The ventilation devices known from the prior art have a flow channel that has an inlet and an outlet and passes through the ventilation device. There is a closing element that is pushed typically by the force of gravity into a first functional position, in which the outlet is released. At the same time, the closing element can be entrained by the medium flowing by and can be pushed into a second functional position in which it closes the outlet. If a hydraulic cylinder, assigned to the ventilation device, is ventilated, then the air or rather the expelled gaseous medium flows through the inlet into the ventilation device, past the closing element, and through the outlet out of the ventilation device. The viscosity of the gaseous medium is not adequate enough to entrain the closing element and to push it in a sealing manner against the outlet. As soon as the ventilation process has been completed, the hydraulic medium flows into the inlet of the ventilation device and from there to the outlet. The hydraulic medium exhibits a significantly higher viscosity than the medium expelled during the ventilation process, so that said hydraulic medium can entrain the closing element when it flows around the same. In this way, the closing element is pushed against the outlet and closes it in a sealing manner. An additional increase in the hydraulic pressure pushes the closing element with greater force against the outlet so that the sealing effect increases as the pressure increases. Therefore, no hydraulic medium can flow out through the outlet while the hydraulic cylinder is pressurized.

The drawback with the known ventilation devices is that in the depressurized state of the hydraulic cylinder, that is, in the first functional position of the closing element, both the inlet and the outlet are released. If, therefore, smaller quantities of hydraulic medium were to find their way to the ventilation device, they could escape through the released flow channel. In addition, the closing element, around which the hydraulic medium flows, possesses a certain degree of inertia, so that the hydraulic medium can escape through the outlet before the closing element is reliably pushed into a second functional position. Therefore, the object of the invention is to provide a ventilation device for a hydraulic cylinder, in particular a dual clutch transmission, so that this ventilation device does not exhibit the aforementioned drawbacks.

SUMMARY OF THE INVENTION

This object is achieved with a ventilation device of the present invention. This ventilation device comprises a flow channel that passes through said ventilation device and that has an inlet and an outlet. In addition, this ventilation device has a closing element that releases the outlet in at least a first functional position and closes said outlet in a second functional position. The ventilation device is characterized by the closing element being arranged in its first functional position in such a way that it closes the inlet. As a result, the hydraulic medium, which is on its way to the ventilation device in a depressurized state, cannot enter into the flow channel and, thus, cannot escape by way of the ventilation device.

Also preferred is a ventilation device which is characterized by the closing element being arranged in a third functional position in such a way that it releases both the inlet and also the outlet and thus the flow channel. In this functional position, the hydraulic cylinder or more specifically the actuator chamber can be ventilated, because the medium that is to be driven out by way of the ventilation process enters into the ventilation device through the inlet and can leave said ventilation device again through the outlet.

Preferred is also a ventilation device which is characterized by a prestressing element that pushes the closing element into its first functional position and preferably subjects it to a prestressing force in this first functional position. The prestressing element allows the closing element to be reliably pushed against the inlet in its first functional position, so that said inlet is closed in a sealing manner. The closing elements rest against the inlet in an especially tight manner when the prestressing element also subjects the closing element to a prestressing force in the first functional position of the closing element, so that it is permanently pressed against the inlet with a defined force.

Preferred is also a ventilation device that is characterized by the closing element being displaceable from its first functional position into its third functional position against a force that is introduced into it by the prestressing element when a first pressure prevails at the inlet. The first pressure effects a force on the closing element that is directed contrary to the force exerted on it by the prestressing element. Ultimately, there is a force equilibrium at which the force exerted on the closing element by the first pressure, and the force, exerted on said closing element by the prestressing element are of the same magnitude, wherein the prestressing element is compressed by a defined amount, so that the closing element is assigned its third functional position, in which both the inlet and also the outlet are released.

Preferred is also a ventilation device, which is characterized by the closing element being displaceable from its third functional position into its second functional position against a force that is introduced into it by the prestressing element when a second pressure prevails at the inlet. Preferably, the second pressure is greater than the first pressure, so that—as seen from the inlet—a greater force acts on the closing element. The result is an additional compression of the prestressing element, so that the closing element is pushed against the outlet and, thus, into its second functional position. In so doing, it sealingly closes the outlet. In this second functional position of the closing element, the hydraulic medium can flow, for example, through the inlet into the ventilation device, but not through the outlet, because this outlet is sealingly closed by the closing element.

Preferred is also a ventilation device that is characterized by the fact that the inlet has a valve seat against which the closing element rests sealingly in its first functional position. In this way, an especially tight abutment of the closing element against the inlet in the region of the valve seat is achieved when the closing element is pushed against the valve seat.

Preferred is also a ventilation device that is characterized by the outlet having a valve seat against which the closing element rests sealingly in its second functional position. In this case, an especially tight abutment of the closing element against the outlet is possible when this closing element is pushed against the valve seat.

Preferred is additionally a ventilation device, which is characterized by the closing element being configured spherically, conically, or cylindrically as a ball. In this case, the spherical shape is an especially simple geometry for the closing element. However, this closing element can also exhibit other shapes, so that it has preferably at least one spherical, conical, or cylindrical region that can be pushed against the inlet and/or the outlet, thus providing there a tight abutment, in particular, on a valve seat.

Preferred is also a ventilation device, which is characterized by the closing element being constructed as a piston. In this case, the spherical, conical, or cylindrical region can be connected to a second region that is configured so as to be preferably cylindrical and exhibits a smaller diameter than the spherical, conical or cylindrical first region, so that the closing element has, on the whole, the shape of a piston. Then the prestressing element can engage preferably with the second region exhibiting the smaller diameter or rather with a shoulder, which is formed in the transitional region between the region exhibiting the smaller diameter and the region exhibiting the larger diameter, and, in so doing, can envelop preferably the region exhibiting the smaller diameter.

Finally, preference is also given to a ventilation device, which is characterized by the prestressing element being constructed as a spring element, preferably as a helical spring. The result, in this case, is an especially simple implementation of a prestressing element. A helical spring can be supported on the closing element in a very simple way, especially if this closing element possesses a piston shape. In this case, the helical spring can be supported on the shoulder, which is formed in the transitional region between the region exhibiting the larger diameter and the region exhibiting the smaller diameter, while said shoulder envelops the region exhibiting the smaller diameter.

DETAILED DESCRIPTION OF THE PREFERRED EMBODIMENTS OF THE INVENTION

Figure 1:
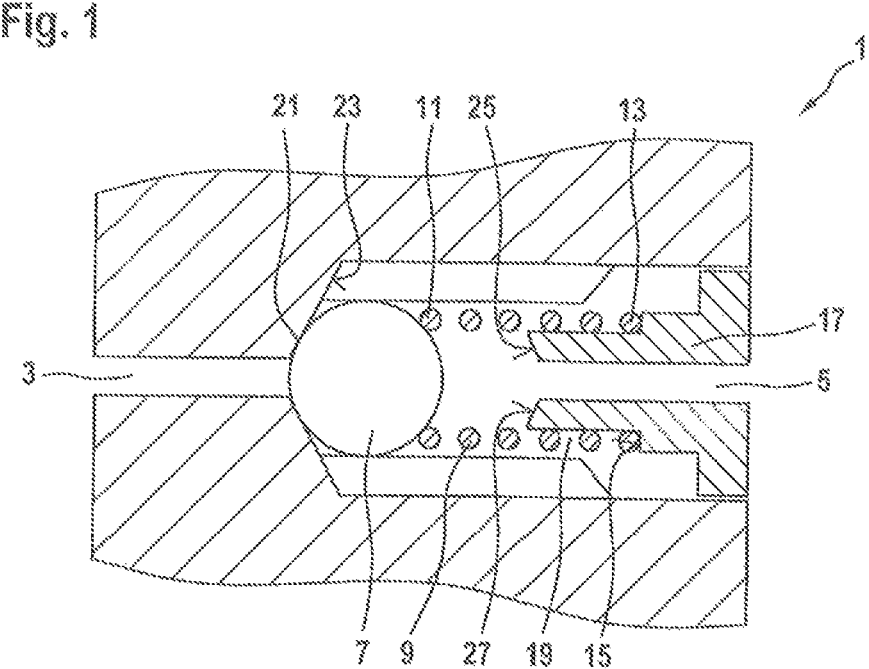
FIG. 1 shows an embodiment of the ventilation device with a closing element in its first functional position.

FIG. 1 shows a ventilation device 1. This ventilation device serves to ventilate an actuator chamber of a hydraulic actuating circuit, in particular a hydraulic cylinder, which is used preferably in connection with a dual clutch transmission, even more preferably, in connection with the clutch of a dual clutch transmission. Preferably, the ventilation device can also be used in connection with a gear actuating cylinder of a dual clutch transmission. The ventilation device 1 makes it possible to ventilate the hydraulic actuator chamber, that is, the hydraulic cylinder, so that a stable hydraulic line is available. A flow channel, which has an inlet 3 and an outlet 5, passes through said ventilation device. The inlet 3 is preferably in fluid connection with the region of the hydraulic actuating circuit by building up a pressure for actuating the hydraulic cylinder. The outlet 5 is preferably in fluid connection with a supply tank of the hydraulic medium that is preferably depressurized.

There is a closing element 7, which releases the outlet 5 in a first functional position, which is shown herein. At the same time, the closing element 7 closes the inlet 3 in this functional position. In the embodiment depicted herein, the closing element is pushed into its first functional position by means of a prestressing element 9. In this case, the prestressing element 9 is constructed preferably as a spring element, preferably as a helical spring. This prestressing element is supported preferably with a first face side 11 on the closing element 7, wherein it is preferably supported with a second face side 13 on a stop face 15, which is disposed preferably in the region of a recess 19 that is introduced into a wall 17 surrounding the outlet 5. The recess 19 is configured preferably as a ring groove.

In the illustrated embodiment, the closing element 7 is configured as a ball. In other embodiments, said closing element can be configured spherically, conically, or cylindrically. Crucial is the fact that the closing element 7 in its first functional position reliably closes the inlet 3 and in its second functional position reliably closes the outlet 5. In an additional embodiment, the closing element 7 can also be configured in the shape of a piston. At the same time, it can exhibit a region, which extends preferably in the direction of the outlet 5 and which exhibits preferably a diameter that is smaller than that of the region that rests sealingly against the inlet 3 when the closing element 7 is located in its first functional position. In this case, the prestressing element 9 can be supported on a shoulder that is formed in the transitional region between the region exhibiting the larger diameter and the region exhibiting the smaller diameter. Then even more preference is given to a prestressing element 9 that envelops the region exhibiting the smaller diameter. It, too, can comprise a spherical, conical, or cylinder region, which faces the outlet 5 and which rests sealingly against the outlet 5 in the second functional position of the closing element 7. Preferably, the prestressing element 9 is prestressed, for example, at least slightly compressed, even if the closing element 7 is in its first functional position. Then said closing element is subjected to a prestressing force even in this position and is pressed reliably and sealingly against the inlet 3.

Preferably, the inlet 3 has a valve seat 21, which comprises a conical area 23 in the embodiment depicted herein. Then in the first functional position of the closing element, this closing element 7 is pushed against the valve seat 21, that is, in this case against the conical area 23, so that the result is an especially tight abutment. The outlet 5 also has preferably a valve seat 25. This valve seat is configured as a conical area 27 in the illustrated embodiment. This design also produces an especially tight abutment when the closing element 7 in its second functional position is pressed sealingly against the outlet 5.

Figure 2:
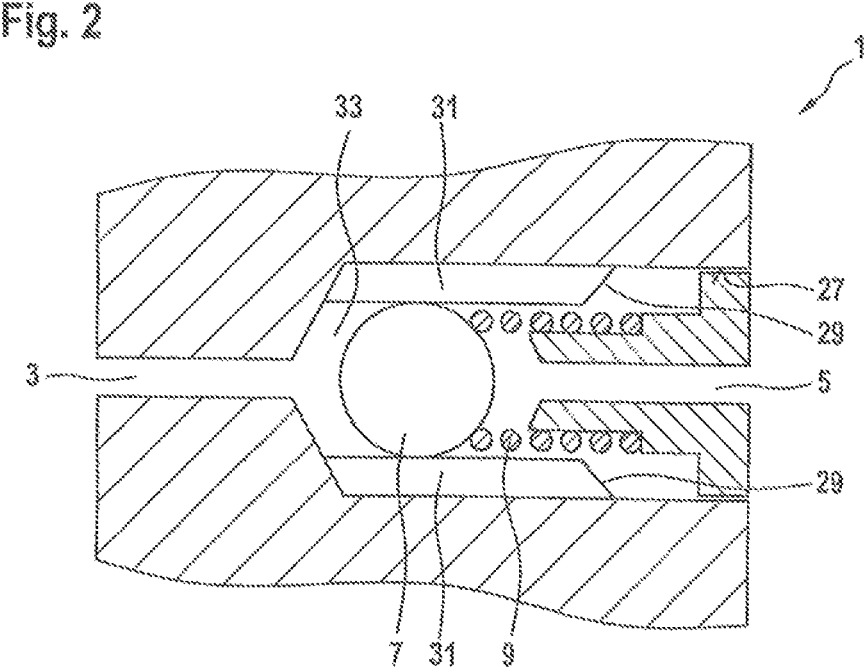
FIG. 2 shows an embodiment, according to FIG. 1, with the closing element in its third functional position.

FIG. 2 shows the embodiment of a ventilation device 1 according to FIG with the closing element 7 being shown in its third functional position. The same and operationally identical elements are provided with the same reference numerals, so that in this respect reference is made to the preceding description. If the inlet 3 is subjected to a pressure that causes a force to be introduced into the closing element 7 that is greater than the force introduced into it by the prestressing element 9, then the closing element 7 in FIG. 2 is displaced to the right. This action results in the release of the inlet 3. The closing element 7 is disposed preferably in a borehole 27 that has radial projections 29 and/or grooves 31 extending in the axial direction. If the closing element 7 is displaced in the borehole 27, it is guided through the projections 29, so that a displacement occurs preferably only in the axial direction of the borehole 27 and said closing element cannot escape in the radial direction.

In the third functional position of the closing element 7, there is, on the one hand, a force equilibrium between the pressure prevailing at the inlet 3 and acting on the closing element 7, and, on the other hand, the force exerted on the closing element 7 by means of the prestressing element 9. As a result, the closing element 7 occupies a quasi-central position, in which both the inlet 3 and also the outlet 5 are released. Thus, the medium, flowing in through the inlet 3, passes into the interior 33 of the ventilation device 1, where it can flow past the closing element 7 through the grooves 31 and can flow out of the interior 33 by way of the outlet 5. It is obvious that there is a defined pressure range, within which the closing element 7 is arranged in its third functional position. In the event that the pressure within this range is relatively low, the inlet 3 is already released in the direction of the interior 33, but the closing element 7 is still located relatively far to the left in FIG. 2, so that the prestressing element 9 is just slightly compressed. If the pressure rises, then a new equilibrium is produced between the pressure force, on the one hand, and the force introduced into the closing element 7 by means of the prestressing element 9, on the other hand, so that the position of said closing element is displaced to the right. At the upper end of the said pressure range, the closing element 7 is disposed relatively far to the right in FIG. 2, so that the prestressing element 9 is compressed to a comparatively high degree. Nevertheless, the outlet 5 is still released. In the pressure range addressed herein, the hydraulic cylinder, to which the ventilation device 1 is assigned, is preferably ventilated, so that any gas or air that is present in said hydraulic cylinder can escape through the ventilation device 1 in that the gas or air passes through the flow channel formed by the inlet 3, the interior 33, the grooves 31, and the outlet 5 in said ventilation device.

Figure 3:
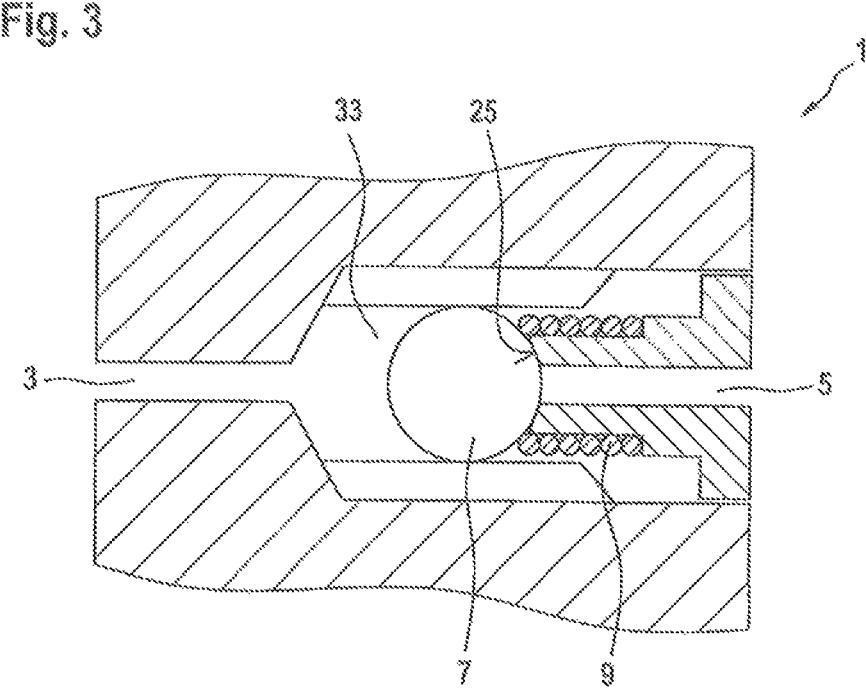
FIG. 3 shows an embodiment, according to FIG. 1, with the closing element in its second functional position.

FIG. 3 shows the embodiment of a ventilation device 1 according to FIG. 1 with the closing element 7 being shown in its second functional position. The same and operationally identical elements are provided with the same reference numerals, so that reference is made in this respect to the preceding description. If the pressure prevailing at the inlet 3 rises above the range described in connection with FIG. 2, then the closing element 7 is displaced, as shown in FIG. 3, all the way to the right against the force of the prestressing element 9, so that said closing element is pushed against the outlet 5. As a result, said outlet is closed in a sealing manner. If the pressure prevailing at the inlet 3 continues to rise, then the closing element 7 is pushed even harder against the outlet 5, preferably against the valve seat 25 that is disposed there, so that the sealing effect is enhanced. Preferably, the closing element 7 moves for the first time into its second functional position when a second pressure prevails at the inlet 3. This pressure is higher than the first pressure discussed in connection with FIG. 2. In the pressure range which is addressed in connection with FIG. 3 and in which the pressure prevailing at the inlet is equal to or greater than the second pressure, the ventilation process is preferably completed; and the hydraulic cylinder is subjected to a hydraulic medium. This hydraulic medium can enter into the ventilation device 1 or more specifically its interior 33 through the released inlet 3, but can no longer flow out via the outlet 5, because this outlet is sealingly closed by means of the closing element 7. Therefore, no loss of the hydraulic medium by way of the outlet 5 can occur in this pressure range.

Figure 4:
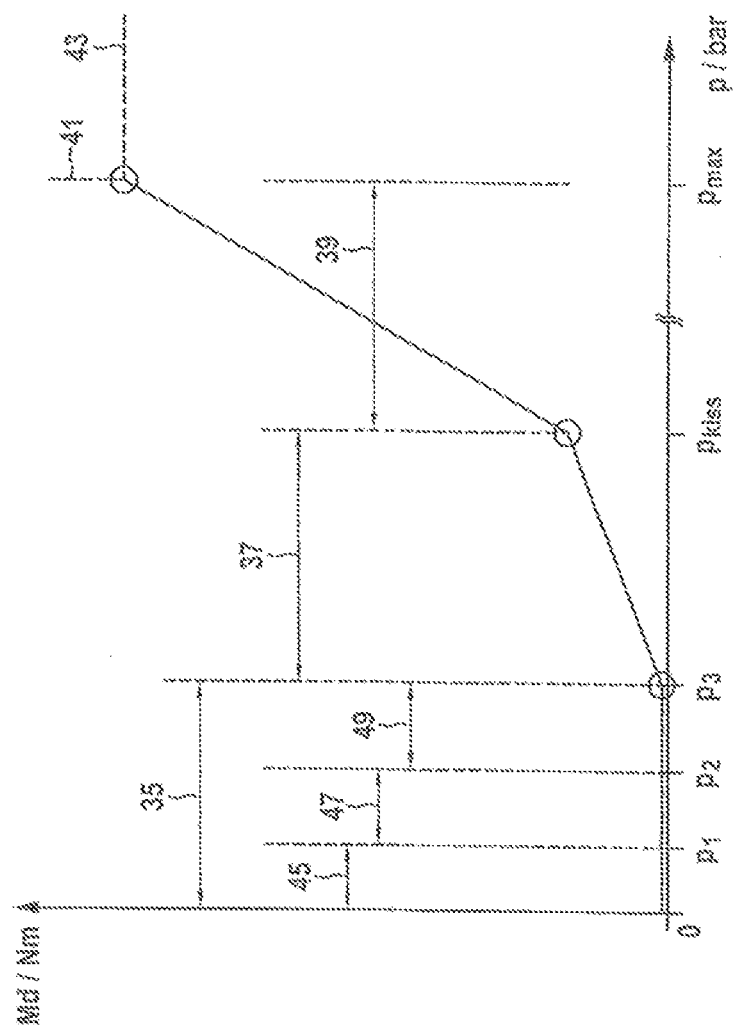
FIG. 4 shows a diagram in which the torque that is transmitted by a clutch is plotted over the pressure prevailing in the actuator chamber.

FIG. 4 shows a diagram in which a torque, which can be transmitted by means of the clutch of a dual clutch transmission, is plotted over the pressure that acts on a hydraulic cylinder actuating the clutch. The pressure ranges that are given indicate preferred values or rather intervals. In other embodiments of the invention, these values may be different.

In a first pressure range, marked with a double arrow 35, the piston of the hydraulic cylinder stays in the at-rest position, because the force that is introduced into it by the applied pressure is not adequate enough to overcome the frictional forces which act on the piston, for example, in the region of its piston seal that rests against the cylinder wall. In a second range, marked with a double arrow 37, the piston is moved and effects a closing of the clutch. In this pressure range a defined torque, which increases as the pressure increases, is already transmitted by the clutch. In a third range, marked with a double arrow 39, the piston essentially has traveled its path, that is, the clutch is essentially closed. In this case, the increasing pressure is used in its entirety to build up the torque that is transmitted by the clutch. In the embodiment depicted herein, the piston begins its movement or more specifically its piston stroke at a pressure of approximately $p_3$ (in this embodiment about 0.8 bar) and at a pressure of approximately $p_{kiss}$ (herein about 2.0 bar) essentially arrives in its end position. A torque can be built up in the range between approximately $p_{kiss}$ and a pressure of about $p_{max}$ (approximately 20.0 bar), where the maximum pressure of the hydraulic system is approximately $p_{max}$. At this maximum pressure, the maximum torque that can be transmitted by the clutch is built up. In this case, the maximum pressure is represented by a line 41 extending parallel to the torque axis. The maximum torque is marked by means of a line 43 that runs parallel to the pressure axis.

The objective is to use a switchable ventilation device to ventilate the hydraulic cylinder preferably in a pressure range in which said hydraulic cylinder is not actuated. For this purpose, there is the first range 35, which comprises a pressure interval ranging from 0.0 bar to approximately $p_3$ in the illustrated embodiment. The prestressing element 9 is configured preferably in such a way that there exits a pressure range from 0.0 bar up to a first pressure $p_1$ (marked with a double arrow 45), in which the closing element 7 is arranged in its first functional position. In this pressure range, no medium can enter into the ventilation device 1 through the inlet 3, that is, there is no leakage and, in particular, no loss of hydraulic medium.

On reaching the first pressure $p_1$, which has a value of approximately 0.3 bar in the embodiment illustrated herein, the closing element 7 is displaced from its first functional position into its third functional position, as a result of which the inlet 3 is released. At the same time, the outlet 5 is released. As described above, the third functional position comprises preferably a range of potential arrangements of the closing element 7, wherein an increasing pressure prevailing at the inlet 3 causes said closing element to be displaced farther and farther in the direction of the outlet 5 against the prestressing force of the prestressing element 9. At a given pressure, a force equilibrium occurs, so that the closing element 7 stays in a position that corresponds to the prevailing force equilibrium. The pressure range, which corresponds to the third functional position of the closing element 7, is marked with a double arrow 47 in FIG. 4. This pressure range comprises preferably the interval ranging from approximately $p_1$ to approximately $p_2$ (about 0.5 bar in this case). In this pressure interval, both the inlet 3 and the outlet 5 of the ventilation device 1 are released, so that the hydraulic cylinder can be ventilated.

On reaching a second pressure $p_2$, which corresponds to approximately 0.5 bar in the embodiment illustrated herein, the closing element 7 is displaced into its second functional position against the force of the prestressing element 9 and closes the outlet 5 in a sealing manner. In this functional position and thus ager reaching the second pressure $p_2$, no medium can escape any more through the outlet 5 of the ventilation device 1, so that no leakage can occur here.

It is clear that the illustrated embodiment has a pressure range (marked with a double arrow 49) in which the closing element 7 is already disposed in its second functional position, that is, closes the outlet 5 in a sealing manner while the piston of the hydraulic cylinder is still in the at-rest position. This range comprises preferably the pressure interval ranging from approximately $p_2$ to approximately $p_3$. This ensures that a ventilation of the hydraulic cylinder is completed or more specifically the ventilation device 1 is closed sealingly, before the piston commences its piston stroke. As a result, the piston is provided with a stable hydraulic line before it is actually actuated.

Hence, it is clear that the switchable ventilation device 1 can be used to ventilate a hydraulic cylinder in a defined pressure range, that is, the range that is marked herein with the double arrow 47, wherein the ventilation device 1 closes in a sealing manner the hydraulic circuit in all other pressure ranges.

As a result, an active ventilation of the hydraulic cylinder can be achieved in a specified pressure window, in this case preferably between $p_1$ and $p_2$ (thus, 0.3 and 0.5 bar). In this pressure range, there is no movement of the hydraulic cylinder, so that the ventilation is performed practically in the functional background. No leakage and thus no loss of hydraulic medium can occur in either the depressurized hydraulic cylinder or in the active hydraulic cylinder which is subjected to an actuating pressure.

There is preferably a control unit that ventilates, as necessary, the hydraulic cylinder, in that the pressure prevailing in the hydraulic circuit is actively controlled in the pressure range provided for the ventilation process. The demand for ventilation can be determined by trial and error and filed in the control unit by application. Then a ventilation operation can take place in a targeted manner, before an activation of the hydraulic cylinder is carried out. Overall, the time frame in which the ventilation device releases a flow path between the outlet 3 and the inlet 5 can be limited to a few milliseconds, as a result of which a leakage and thus, in particular, a loss of hydraulic medium is minimized. Thus, the closing element 7 can be held in a controlling and/or regulating manner in the third functional position; or more specifically the flow path between the outlet 3 and the inlet 5 can be interrupted in a targeted manner following the passage of a defined period of time (the time frame). At the same time, the closing element 7 is held in the third functional position, that is, the flow path is released, for example, as a function of a defined set pressure.

The invention claimed is:

1. A ventilation device for a hydraulic cylinder connectable to a member to be actuated, comprising:
a body having a chamber provided with a first port communicable with said hydraulic cylinder and a second port exclusively communicable with a selected space;
a closure member disposed in said chamber, displaceable along a line of travel into sealing engagement with either of said ports and being laterally spaced from a surface of said chamber, relative to said line of travel to allow the passage of a fluid; and
a prestressed member disposed in said chamber between said body and said closure member, along said line of travel,
wherein said body includes a portion projecting into said prestressed member, providing said second port engagable by said closure member, and the force exertable by said prestressed member is greater than the force of a fluid at a first pressure applied to said first port, urging said closure member into sealing engagement with said first port, the force exertable by said prestressed member is less than the force of a fluid at a second pressure applied to said first port, urging said closure member into sealing engagement with said second port, and between the force of a fluid at a third pressure between said first and second pressures applied to said first port, urging said closure member out of sealing engagement with both of said ports.

2. The device of claim 1 wherein said ports provide seating surfaces engageable by said closure member in sealing engagement.

3. The device of claim 1 wherein said chamber is provided with a splined wall disposed concentrically relative to said line of travel for guiding said closure member along said line of travel.

4. The device of claim 1 wherein the configuration of said closure member comprises one of a spherical, conical and cylindrical configuration.

5. The device of claim 1 wherein said prestressed member comprises a spring.

6. The device of claim 5 wherein said spring is a helical spring.

* * * * *